UNITED STATES PATENT OFFICE.

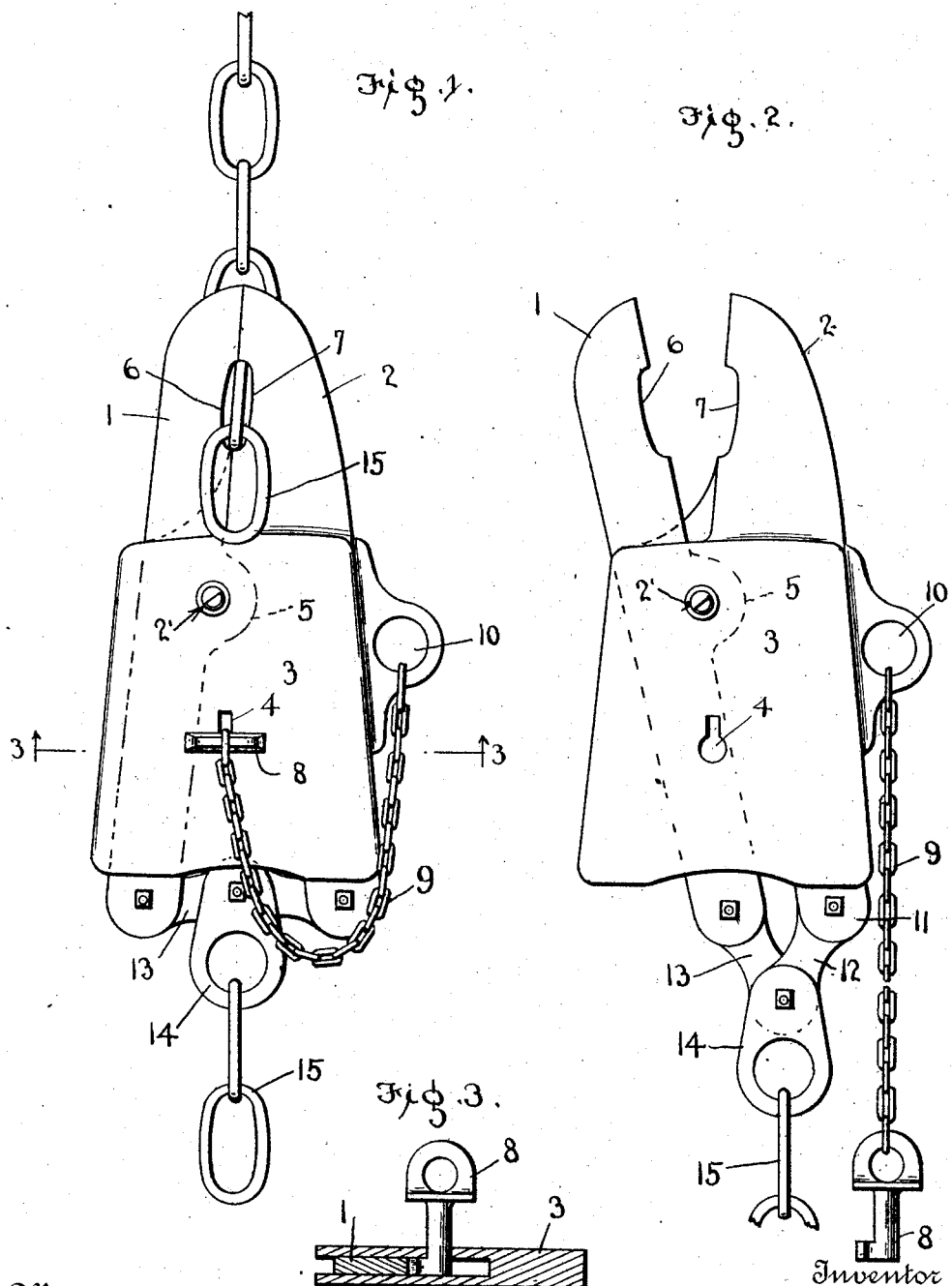

WALLACE EUGENE KEMPTON, OF COQUILLE, OREGON.

LOGGING-CHAIN HOOK.

1,039,957.   Specification of Letters Patent.   Patented Oct. 1, 1912.

Application filed July 20, 1911. Serial No. 639,695.

*To all whom it may concern:*

Be it known that I, WALLACE E. KEMPTON, a citizen of the United States, residing at Coquille, in the county of Coos and State of Oregon, have invented certain new and useful Improvements in Logging-Chain Hooks; and I do declare the following to be a full, clear, and exact description of the invention, such as will enable others skilled in the art to which it appertains to make and use the same.

This invention relates to improvements in hooks for logging chains.

The object of the invention is to provide a simple and efficient device of this character by which the free end of the chain after being brought around the logs may be securely fastened thereto and readily and conveniently detached when required.

Another object of the invention is to provide improved means for firmly locking the hook to render it impossible to release it until the locking element is removed by the operator.

In the accompanying drawings: Figure 1 represents a front elevation of a chain hook constructed in accordance with this invention, and shown in locked position. Fig. 2 is a similar view with the hook in open position. Fig. 3 is a transverse section taken on the line 3—3 of Fig. 1.

In the embodiment illustrated a hook is shown composed of two elongated members 1 and 2 pivotally connected at a point substantially midway between their ends with one member fitting within the other.

The member 2 has a shell 3 offset therefrom and preferably made integral therewith and projecting beyond one edge thereof, said shell having its opposite ends open to receive said member 1 and permit it to swing freely in said shell. A key-hole 4 is formed in said shell for a purpose to be described.

The member 1 is made substantially in the form of a flat bar with an apertured rounded ear 5 extending from one edge thereof and with a recess 6 formed in the same edge near one end which is designed to register with a similar recess 7 in the adjacent edge of the member 2 and forms in conjunction therewith a chain engaging aperture. This aperture, when the members 1 and 2 are in closed position as shown in Fig. 1, engages the free end of the chain which has been passed around the load of logs and when the members are locked together securely holds said chain in operative position. The member 2 is apertured near the upper end of the offset casing as shown at 2', said aperture being designed to register with the aperture in the ear 5 through which a pivot passes and connects said members, the ear 5 being arranged within the casing to permit the member 1 to operate therein and form a movable jaw. The key-hole 4 is arranged in longitudinal alinement with the pivot aperture 2' and is designed to receive a key 8 which is turned when the parts are in closed position a sufficient distance to cause the bit thereof to engage the inner edge of the member 1 below the pivot which connects said members and thereby lock said member 1 from swinging outward at its upper recessed end thus securely fastening said members in engagement with the link of the chain inserted in the recess formed by the registering recesses of the two members.

The key 8 is preferably secured to one end of a chain 9 the other end of which is secured to an eye 10 formed on the outer edge of the member 2 whereby the key is always retained in position ready for use.

A lug 11 extends from the lower corner at the outer edge of the member 2 to which a link 12 is pivotally connected. A similar link 13 is pivoted at one end to the lower end of the member 1 and the free ends of said links are pivotally connected to an eye 14 to which one end of the chain 15 is secured.

From the above description the operation of this device will be clearly understood without a more extended explanation it being understood that when the key is in the hole with its bit in engagement with the edge of the member 1 it is impossible for said member to move until said key has been turned, and the tendency of said member 1 to swing open under the strain exerted by the pull of chain 15 on links 12 and 13 securely holds the bit of the key in engagement with the edge of said member 1 and prevents the key from turning accidentally, and the disengagement of the hook from the securing chain. All danger of the hook being accidentally tripped is thus obviated.

I claim as my invention—

A logging chain hook comprising two members pivotally connected intermediately of their ends and having co-acting jaws at one end and their other ends spaced apart when in operative position, a log engaging element connected at one end with the other ends of said members whereby said jaws are forced apart when a pull is exerted on said element, and means insertible between the spaced ends of said members and rotatable to hold them spaced and thereby lock the jaws of the members against opening, the strain exerted by the log engaging element tending to draw said spaced ends toward each other and into closer engagement with the jaw locking means, thereby preventing accidental revolving of said means.

In testimony whereof I have hereunto set my hand in presence of two subscribing witnesses.

WALLACE EUGENE KEMPTON.

Witnesses:
R. H. SMITH,
B. L. SKEELS.

Copies of this patent may be obtained for five cents each, by addressing the "Commissioner of Patents. Washington, D. C."